(12) United States Patent
Tang et al.

(10) Patent No.: US 12,414,030 B2
(45) Date of Patent: Sep. 9, 2025

(54) SERVER DISCOVERY IMPROVEMENT WHEN APPLICATION SERVER CHANGES

(71) Applicant: LENOVO (BEIJING) LIMITED, Beijing (CN)

(72) Inventors: Tingfang Tang, Beijing (CN); Dimitrios Karampatsis, Ruislip (GB); Genadi Velev, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 348 days.

(21) Appl. No.: 17/799,359

(22) PCT Filed: Feb. 14, 2020

(86) PCT No.: PCT/CN2020/075362
§ 371 (c)(1),
(2) Date: Aug. 12, 2022

(87) PCT Pub. No.: WO2021/159505
PCT Pub. Date: Aug. 19, 2021

(65) Prior Publication Data
US 2023/0106757 A1    Apr. 6, 2023

(51) Int. Cl.
*H04W 40/24*  (2009.01)
*H04W 40/28*  (2009.01)
*H04W 40/34*  (2009.01)

(52) U.S. Cl.
CPC ......... *H04W 40/246* (2013.01); *H04W 40/28* (2013.01); *H04W 40/34* (2013.01)

(58) Field of Classification Search
CPC ... H04W 40/246; H04W 40/28; H04W 40/34; H04W 8/26; H04W 36/12; H04W 68/00; H04W 8/08; H04W 76/22; H04W 80/10; H04W 88/18; H04L 65/1063; H04L 65/80; H04L 2101/659; H04L 2101/668; H04L 61/5007

See application file for complete search history.

(56) References Cited

U.S. PATENT DOCUMENTS

| 2018/0192390 A1* | 7/2018 | Li ......................... H04W 72/53 |
| 2019/0058741 A1 | 2/2019 | Mufti et al. |
| 2021/0099943 A1* | 4/2021 | Dannebro ......... H04W 36/0011 |

(Continued)

FOREIGN PATENT DOCUMENTS

| CN | 109842643 A | 6/2019 |
| CN | 109981316 A | 7/2019 |
| WO | 2019080673 A1 | 5/2019 |

OTHER PUBLICATIONS

WO_2019/101292_A1 (Year: 2019).*

(Continued)

*Primary Examiner* — Rushil P. Sampat
(74) *Attorney, Agent, or Firm* — Kunzler Bean & Adamson

(57) ABSTRACT

Method and apparatus for application server change are disclosed. A method includes obtaining information on application server change for an application when server changes to a target application server and making a decision to inform a user equipment ("UE") to rediscover the target application server for the application or configure UPF to steer traffic to and from the target application server for the application.

20 Claims, 8 Drawing Sheets

(56) References Cited

U.S. PATENT DOCUMENTS

2022/0360977 A1\* 11/2022 Kim ..................... H04L 65/80

OTHER PUBLICATIONS

WO_2021/029512_A1 (Year: 2021).\*
PCT/CN2020/075362, "Extended European Search Report", EPO, Sep. 25, 2023, pp. 1-10.
CATT, "Solution for KI #2: Edge relocation", SA WG2 Meeting #S2-136 Ad-hoc S2-2000695, Jan. 13-17, 2020, pp. 1-4.
International Searching Authority, "Written Opinion of the International Searching Authority," PCT/CN2020/075362, Nov. 12, 2020, pp. 1-4.
3GPP, 3rd Generation Partnership Project; Technical Specification Group Services and System Aspects; Study on enhancement of support for Edge Computing in 5G Core network (5GC) (Release 17), 3GP TR 23.748 V0.3.0 (Jan. 2020), pp. 1-40.

\* cited by examiner

SERVER DISCOVERY IMPROVEMENT WHEN APPLICATION SERVER CHANGES

FIELD

The subject matter disclosed herein generally relates to wireless communications, and more particularly relates to server discovery improvement when application server changes.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Reference Signal (RS), Single Carrier Frequency Division Multiple Access (SC-FDMA), Time-Division Duplex (TDD), Time Division Multiplex (TDM), User Entity/Equipment (Mobile Terminal) (UE), Universal Mobile Telecommunications System (UMTS), Worldwide Interoperability for Microwave Access (WiMAX), Protocol Data Unit (PDU), PDU Session Anchor (PSA), data network (DN), Service and Session Continuity (SSC), Data Network (DN), DN Access Identifier (DNAI), uplink classifier (UL classifier or ULCL), User Plane Function (UPF), Branching Point (BP), Session Management Function (SMF), Policy Control Function (PCF), Network Exposure Function (NEF), Application Function (AF), Unified Data Repository (UDR), 5G core (5GC), Policy and Charging Control (PCC). Access and Mobility Management Function (AMF), Application Server (AS), Edge Application Server (EAS), Edge Data Network (EDN), Core Network Control Plane (CN CP), Traffic routing information (TRI), Edge Enabler Server (EES), Edge Enabler Client (EEC).

Edge platform is deployed for providing local services. Application server(s) (e.g. Enterprise Application Server (EAS)) are deployed in the edge platform. UE(s) access an application server via a UPF (used as a PSA (PDU Session Anchor)) by a PDU session. The PDU session is established between the UE and the PSA UPF. One PDU session may support one or more applications.

Due to UE mobility, load balance on the server side or other reasons, application server change from a source application server to a target application server may happen. After the application server change, the UE has to access the target application server. Due to UE mobility, the PSA relocation may be met, which leads to application server change. On the other hand, the application server due to the load balance on the server side may not lead to PSA relocation, since the target application server may still connect to the UE via the same PSA UPF that connects to the source application server.

An example of application server change is shown in FIG. 1. Firstly, a PDU session is established between UE and central DN (Data Network). Traffic routing information (TRI), which is also the information included in the AF request to influence traffic routing for session(s), is derived from AF request and sent to SMF. As shown in FIG. 1, TRI1, TRI2 and TRI3 that are derived from AF request 1, AF request 2 and AF request 3 are sent from AF to Core Network Control Plane (CN CP), respectively. The AF can be EDN CS or EES (centralized EES or distributed EES) or other network function that provides the corresponding functionalities to interact for the CN CP and application server. When UE moves to the service area of DNAI1/EDN1, a new user plane branch using ULCL can be established based on the available TRI1 (for App1) and TRI2 (for App2). When DNAI change or PSA relocation happens, the notification is sent to the AF (i.e. EDN CS/EES and/or EES1 shown in FIG. 1) for AF request 1 and AF request 2 with the corresponding application identifier App1 and App2.

Traditionally, the EAS11 (application server deployed within DNAI1/END1 for App1) and EAS12 (application server deployed within DNAI1/END1 for App2) can be discovered for App1 and App2 using application layer solution. In particular, the information about EAS11 and EAS12 can be sent to the UE using application layer method (e.g EES informs EEC). Accordingly, the UE for the existing active application can exchange user plane data packets with EAS11 and EAS12 within EDN1 using existing mechanism. Newly initiated user plane data exchange between the UE and the application server can choose to be terminated in EDN1 for App1 and App2, e.g. the UE initiates new DNS Query for starting App1 and App2.

However, the above-described solution is on application layer. There is no network mechanism that can be used for server re-discovery when the server changes. In other words, if an application is not provided with application layer solution for server re-discovery when the server changes, the UE cannot re-discover the changed application server. The present application aims to provide methods and apparatuses to implement server discovery on network layer (i.e. lower layer) when application server changes.

BRIEF SUMMARY

Method and apparatus for application server change are disclosed.

In one embodiment, a method comprises obtaining information on application server change for an application when server changes to a target application server; and making decision to inform UE to rediscover the target application server for the application or configure UPF to steer traffic to and from the target application server for the application.

In one embodiment, the method performed at a SMF comprises: obtaining information on application server change for an application when server changes to a target application server; and making decision to inform UE to rediscover the target application server for the application or configure UPF to steer traffic to and from the target application server for the application.

In another embodiment, the method further comprises obtaining traffic routing preference for the application server change, and making decision based on the obtained traffic routing preference for the application server change.

In some embodiment, the information on application server change for the application and the traffic routing preference for the application server change are obtained from AF while the AF acknowledges a notification of user plane management event. Alternatively, the information on application server change for the application and the traffic routing preference for the application server change are obtained from information on AF update request. Further alternatively, the information on application server change for the application and the traffic routing preference for the application server change are obtained from application relocation exposure event notification that is subscribed from AF.

In some embodiment, the method further comprises informing the UE to rediscover the target application server for the application. Alternatively, the method further comprises configuring the UPF to steer the traffic to and from the target application server for the application. The information on application server change for the application may be indication for application server change or information on the target application server. The information on application server change for the application and the traffic routing preference for the application server change may be information on application server change for flow(s) of the application and traffic routing preference for the application server change for flow(s) of the application.

In one embodiment, a method performed at a AF comprises obtaining information on application server change for an application when server changes to a target application server; and sending the information on application server change to SMF.

In another embodiment, a SMF comprises a receiver configured to obtain information on application server change for an application when server changes to a target application server; and a processor configured to make decision to inform UE to rediscover the target application server for the application or configure UPF to steer traffic to and from the target application server for the application.

In yet another embodiment, an AF comprises a receiver configured to obtain information on application server change for an application when server changes to a target application server; and a transmitter configured to send the information on application server change to SMF.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
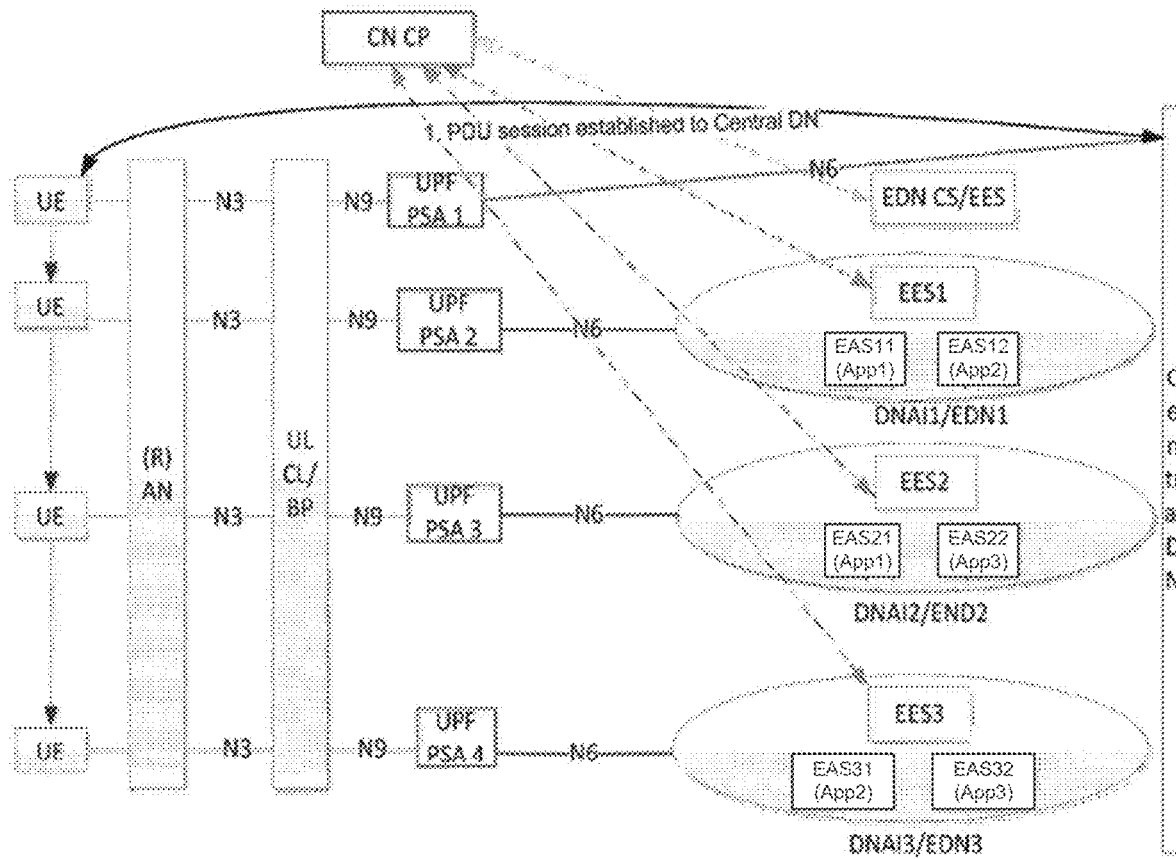
FIG. 1 illustrates an example of server change due to UE mobility based on application deployment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

The present application aims to provide lower layer (layer lower than the application layer) solution on server discovery when application server changes for application(s) e.g. deployed in edge environment. When application server changes from a source application server to a target application server, SMF obtains information on application server change (e.g. indication for application server change, or information on the target application server) for the application and preferably traffic routing preference for the application server change, and according to the obtained information, makes decision to inform the UE to rediscover the target application server for the application or configure the UPF to steer the traffic to and from the target application server for the application. The traffic routing preference for the application server change provides the preference from the application side that whether the UE is necessary to be aware of the application server change. The UPF to steer the traffic can be ULCL or BP UPF when there are multiple PSA UPFs for the PDU session. The ULCL or BP UPF can be a standalone UPF or be co-located with the PSA UPF. The UPF to steer the traffic can also be the PSA UPF or the UPF of N3 terminating point when there is only one PSA UPF for the PDU session (which means that there is no ULCL or BP UPF). Detailed embodiments are described in detail.

For all the embodiments, the traffic routing procedure between the AF and the core network includes the following situations: (1) AF requests to influence traffic routing for Sessions identified by an UE address, (2) AF requests to influence traffic routing for Sessions not identified by an UE address, affecting future PDU sessions, and (3) AF requests to influence traffic routing for Sessions not identified by an UE address, affecting ongoing PDU sessions.

Figure 2:
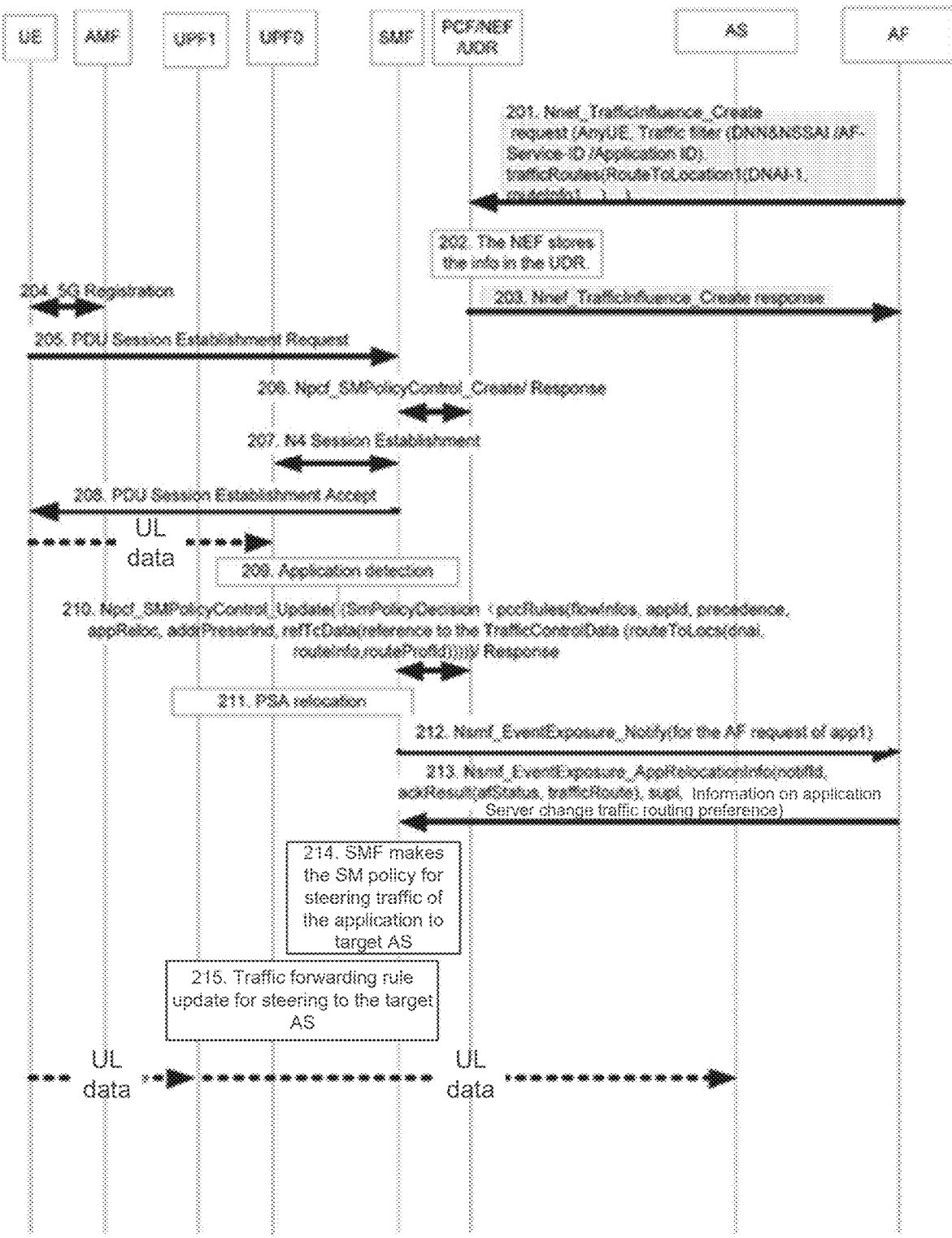
FIG. 2 illustrates an example of server discovery according to a first embodiment.

FIG. 2 illustrates a first embodiment of the present application. According to the first embodiment, it is assumed that (1) service provider deploys the service into the EDNs (Edge Data Networks), and different applications may have different deployments; (2) AF sends traffic routing information per DNN&NSSAI (or AF-service-ID) and application to the 3GPP network via AF request with AF transaction identifier; and (3) The AF can obtain the information on application server change for the application (e.g. information on target application server for the application) when application server changes.

As shown in FIG. 2, the following network elements are involved: UE; AMF (Access and Mobility Management Function); UPF (User Plane Function) (in FIG. 1, UPF0 is the PDU Session Anchor (PSA) that the UE uses to connect to the source application server while UPF1 is the PDU Session Anchor (PSA) that the UE uses to connect to the target application server) Note that ULCL or BP can be added or relocated as an standalone UPF or co-located with PSA UPF; SMF (Session Management Function); PCF (Policy Control Function); NEF (Network Exposure Function); UDR (Unified Data Repository); AS (Application Server) (in FIG. 2, AS is the target application server); and AF (Application Function). In FIG. 2, PCF/NEF/UDR is shown as one box for simplicity.

In step 201, an AF request with traffic routing information is sent from AF to the core network per application without individual UE address. As illustrated in FIG. 2, in the Nnef_TrafficInfluence_Create request, "AnyUE" is contained in the parameter, which means that no individual UE is indicated.

In step 202, the NEF stores the traffic routing information into the UDR. Since the AF request has no specific UE address (IP address or MAC address), the Data Key used for the storage may be AF Transaction Internal ID, S-NSSAI and DNN and/or Internal Group Identifier or SUPI, which implies (1) AF Transaction Internal ID, and S-NSSAI & DNN; or (2) AF Transaction Internal ID, S-NSSAI & DNN and Internal Group Identifier; or (3) AF Transaction Internal ID, S-NSSAI & DNN and SUPI; or (4) AF Transaction Internal ID and Internal Group Identifier or (5) AF Transaction Internal ID and SUPI.

In step 203, the response message is sent out for the AF request, e.g. from the NEF to the AF.

In step 204, UE registers into the 5G system. The UE sends Registration Request message to the AMF and gets the Registration Accept from the AMF.

In step 205, the UE initiates a PDU session establishment procedure by sending a PDU session establishment request to the SMF.

In step 206, the SMF retrieves the SM policy using SM Policy Association Establishment procedure during the PDU session establishment procedure. The traffic routing information (e.g. for the application with the Application ID indicated in step 201) can be retrieved from the PCF (or from the UDR via the PCF) if the PDU session is established for the application.

In step 207, The PSA UPF selection for the PDU session is done by the SMF. The SMF initiates an N4 Session Establishment procedure with the selected UPF (UPF0 in FIG. 2). The SMF can provide packet detection, enforcement and reporting rules to be installed on the UPF for this PDU Session.

In step 208, PDU Session Establishment Accept is sent from the SMF to the UE to complete the establishment of the PDU session. The uplink and downlink data may be sent between the UE and UPF0 (only uplink data is shown in FIG. 2).

A PDU session may be used for a plurality of applications. Based on the detection of the application (e.g. the application with the Application ID indicated in step 201) in step 209, the SMF can update the SM policy using SM Policy Control Update procedure in step 210. If the traffic routing information for the application is not obtained in step 206, the traffic routing information for the application can be obtained in step 210.

In step 211, a condition for an AF notification, e.g. PSA relocation (from UPF0 to UPF1), has been met.

In step 212, the SMF sends the AF notification (notification of user plane management event) to the AF that is subscribed for SMF notifications. The notification of user plane management event is also referred to as user plane management event notification.

When the AF receives the notification of user plane management event that PSA relocation from UPF0 to UPF1 is met, an application server change is triggered by the user plane management event. For example, a source application server connected with UPF0 is changed to a target application server connected with UPF1.

The AF can obtain and acknowledge the information on application server change for the application and traffic routing preference for the application server change. In step 213, the AF sends the information on application server change for the application (e.g., the information on the target application server for the application) and traffic routing preference for the application server change to the SMF.

In step 214, when the traffic routing preference for the application server change in step 213 indicates that the traffic is preferred to be steered within core network and the UE can be unware of the server change, the SMF makes decision, based on the information on the application server change (e.g. the information on the target application server for the application) and traffic routing preference for the application server change (the traffic is preferred to be steered within core network), to configure UPF to steer the traffic of the application to and from the target application server.

Based on the decision in step 214, the SMF updates the ULCL or BP UPF, which can be standalone or co-located with UPF1, with the forwarding rule for steering the traffic to the target application server in step 215. Additionally, the SMF may also send the information on the source application server for the application and/or the application identification to the UPF1. The information on the source application server for the application and/or the application identification may come from the AF in step 213, or are pre-stored in the SMF.

When new packets are exchanged between the UE and the target application server (AS in FIG. 2) for the application, the ULCL or BP UPF performs the traffic steering to and from the target application server.

For uplink traffic from the UE for the application, the packet with destination IP address of the source application server is steered to the target application server. For example, an IP address replacement of the destination IP address of the packet with the IP address of the target application server may be performed. Alternatively, an outer header with the IP address of the target application server as destination IP address may be added to the uplink traffic packet.

For downlink traffic from the target application server to the UE, the packet with the source IP address of the target application server is replaced with the source IP address of the source application server.

According to the first embodiment, the SMF obtains the information on application server change for the application (e.g. the information on the target application server for the application) as well as the traffic routing preference for the application server change in step 213 and makes decision to configure the UPF1 to steer the traffic to and from the target application server for the application.

Figure 3:
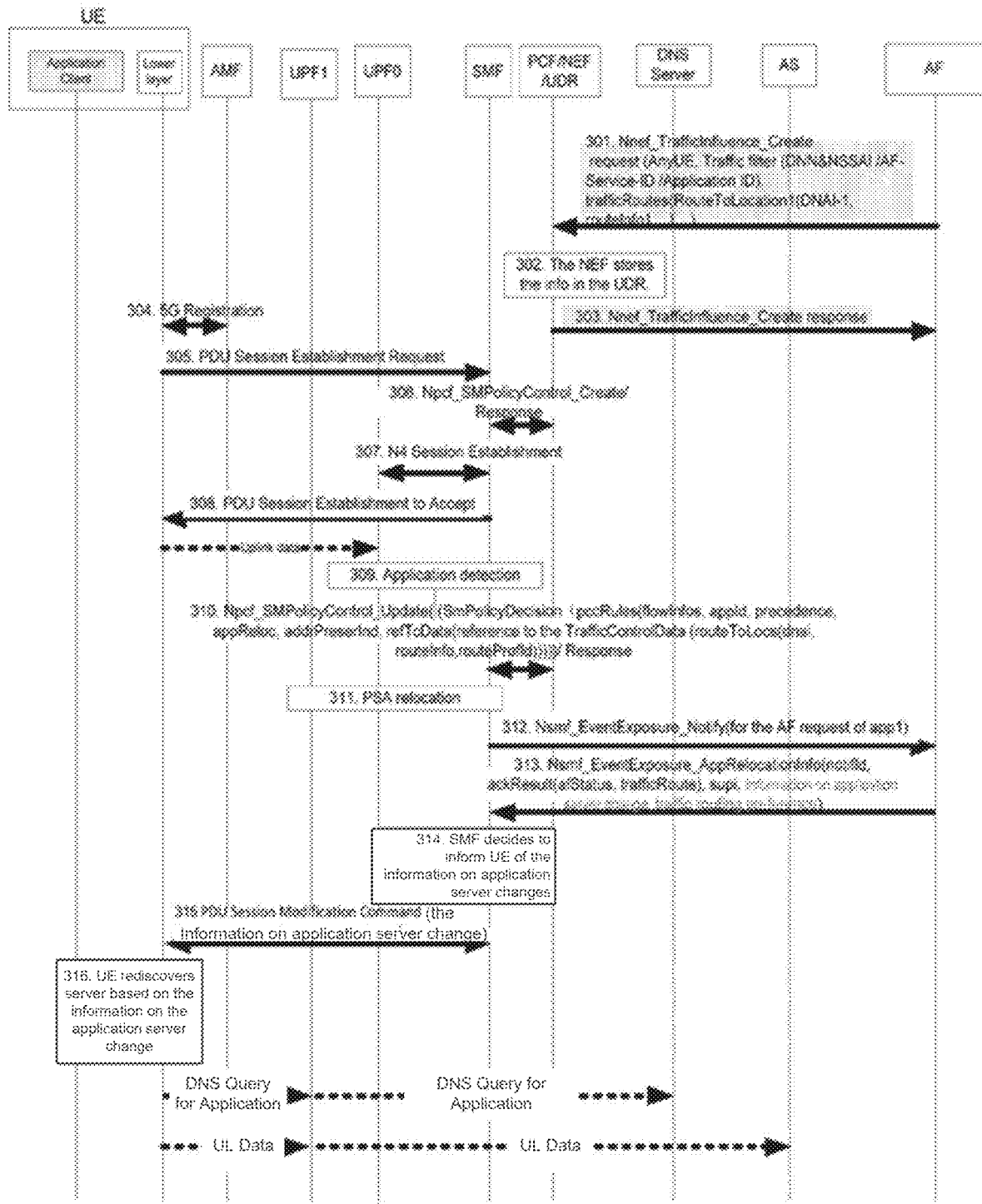
FIG. 3 illustrates an example of server discovery according to a second embodiment.

FIG. 3 illustrates a second embodiment of the present application. According to the second embodiment, it is assumed that (1) service provider deploys the service into the EDNs (Edge Data Networks), and different applications may have different deployments; (2) AF sends traffic routing information per DNN&NSSAI (or AF-service-ID) and application to the 3GPP network via AF request with AF transaction identifier; (3) The AF can obtain the information on application server change for the application (e.g. information on target application server, or indication for application server change) when application server changes; and (4) The core network cannot change the IP address of the packet when application server changes. The above assumptions (1)-(3) according to the second embodiment are the same as the assumptions (1)-(3) according to the first embodiment.

As shown in FIG. 3, the involved network elements include all of the network elements described in the first embodiment as well as a DNS server. In addition, the UE according to the second embodiment is further comprised of "application client" and "lower layer".

Steps 301 to 312 are the same as steps 201 to 212. The detailed description of steps 301 to 312 is omitted.

In step 313, the AF sends the information on application server change for the application (e.g. indication for application server change or the information on the target application server for the application) and traffic routing preference for the application server change to the SMF, also similar to step 213. The difference lies in that, the traffic routing preference for the application server change in step 213 indicates that the traffic is preferred to be steered within core network and the UE can be unaware of the server change, while, on the other hand, the traffic routing preference for the application server change in step 313 indicates that it is preferred to rediscover the IP address of the target application server by the UE. In addition, the information on application server change for the application may be an indication for application server change but does not contain the information on the target application server.

In step 314, when the traffic routing preference for the application server change in step 313 indicates that it is preferred to rediscover the IP address of the application server by the UE, the SMF makes decision, based on the information on application server change for the application and traffic routing preference for the application server change (rediscover the IP address of the application server by the UE), to inform the UE of the information on application server change.

Based on the decision in step 314, the SMF informs the UE of the information on application server change for the application in step 315. The information may be information on the target application server for the application (e.g. the IP address of the target application server, or the FQDN of the target application server), or the indication for application server change (e.g. a trigger for UE re-initiating DNS Query for the application). Additionally, the SMF may also send the information on the source application server and/or the application identification to the UE. The information on the source application server and/or the application identification may come from the AF in step 313, or are pre-stored in the SMF.

In step 316, the UE rediscovers the target application server for the application based on the information received in step 315.

If the information is the IP address of the target application server for the application, the UE exchanges the service data with the target application server for the corresponding application.

If the information includes the FQDN of the target application server for the application, the UE re-initiate DNS query for the corresponding application using the received FQDN of the target application server for the corresponding application to the DNS server.

If the information includes the trigger for UE initiating DNS Query for the application, the UE disables the old DNS query result for the corresponding application and re-initiates a new DNS query for the corresponding application to the DNS server.

Whether and how the lower layer and the application client interact within the UE may be decided by implementation.

If the target application server is for additional traffic flow for the application, the new exchange between the UE and the target application server can be established. If the target application server is for replacing the source application server, the lower layer can disable the connection between the UE and the source application server and the application client can re-initiate the DNS query or start to establish the connection between the UE and the target application server triggered by the disconnection between the UE and the source application server for the application. If the target application server is for replacing the source application server, alternatively, new interaction between the lower layer and the application client can be added to establish the connection between the UE and the target application server.

According to the second embodiment, the SMF obtains the information on the application server change as well as the traffic routing preference for the application server change in step 313 and makes decision to configure the UE to rediscover the target application server for the application.

Figure 4:
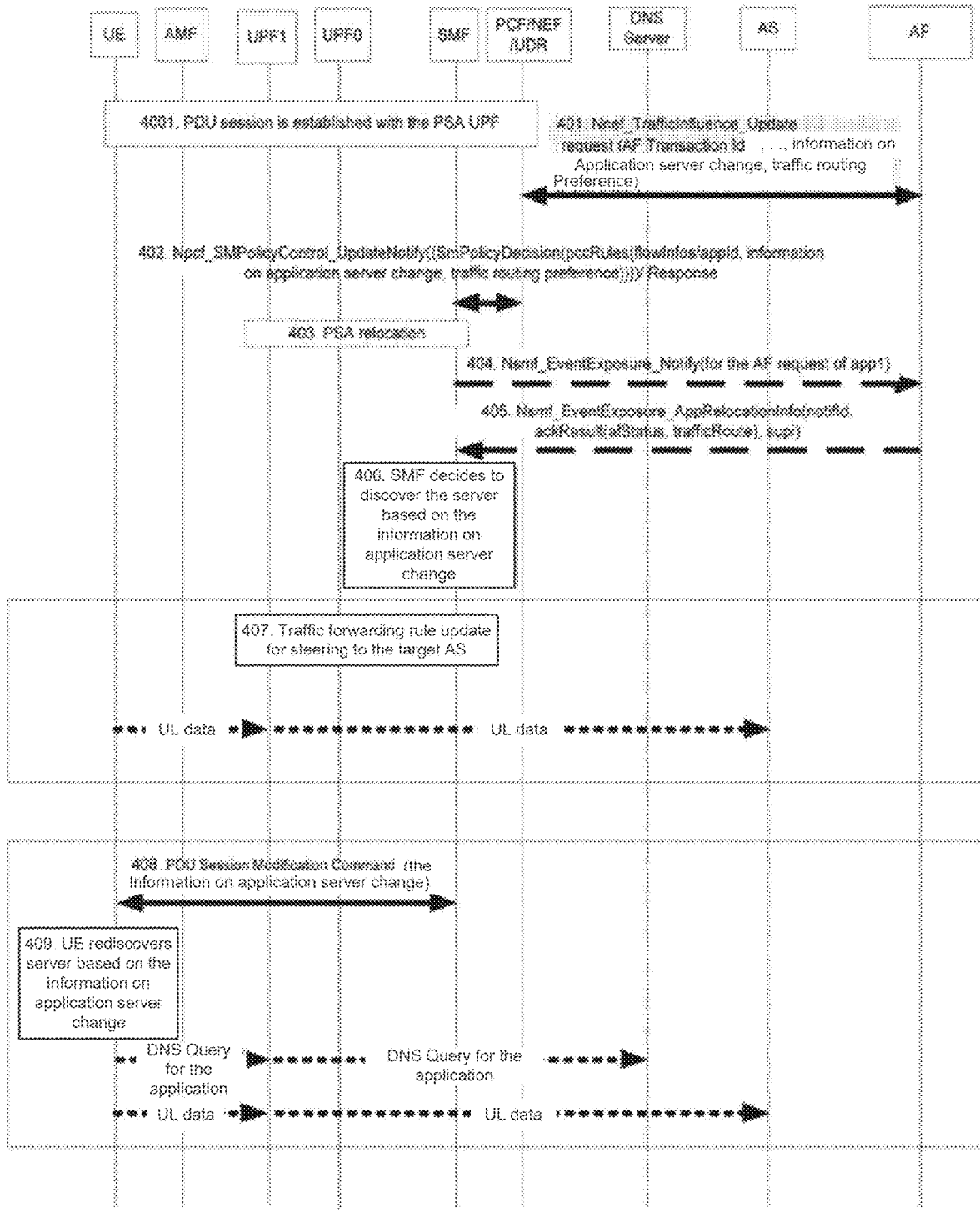
FIG. 4 illustrates an example of server discovery according to a third embodiment.

FIG. 4 illustrates a third embodiment of the present application. According to the third embodiment, it is assumed that (1) service provider deploys the service into the EDNs (Edge Data Networks), and different applications may have different deployments; (2) AF sends traffic routing information per DNN&NSSAI (or AF-service-ID) and application to the 3GPP network via AF request with AF transaction identifier; (3) The AF can obtain the information on application server change for the application when application server changes; (4) The PDU session is already established; and the AF request with the information to influence traffic routing is sent to the core network (i.e. Nnef_TrafficInfluence_Create has been performed). (5) The application server change is triggered by application, e.g. for the load balance among application servers within the EDNs. The above assumptions (1)-(3) according to the third embodiment are the same as the assumptions (1)-(3) according to the first or the second embodiment.

As shown in FIG. 4, the involved network elements include all of the network elements described in the second embodiment, except that the UE according to the third embodiment is not further limited.

First, as described in the above assumption (4), step 4001 indicates that the PDU session has been established with the PSA UPF (UPF0 in FIG. 4), and the AF request with the information to influence traffic routing has been sent to the core network using Nnef_TrafficInfluence_Create.

Application server for the application may change from a source application server to a target application server due to e.g. load balance among application servers within the EDNs. The AF can obtain the information on application server change for the application (e.g. indication for application server change or information on the target application server) and traffic routing preference for the application server change. In step 401, the AF informs the information on application server change for the application and traffic routing preference for the application server change to the core network using AF update request message (Nnef_TrafficInfluence_Update request). As illustrated in FIG. 4, in Nnef_TrafficInfluence_Update request, "AF Transaction ID" is required to correlate the update with the created AF request in step 4001. In FIG. 4, the AF update request message is sent to the core network, and the NEF updates the information contained in the received AF update request message in UDR, and the update information is notified to the subscribed PCF.

In step 402, the SMF obtains the information on the application server change and traffic routing preference for the application server change using Npcf_SMPolicyControl_UpdateNotify service operation.

Steps 403-405 may be optional. The application server change from source application server to target application server may or may not lead to a PSA relocation (UPF change). As illustrated in FIG. 4, suppose the established PDU session uses UPF0 to connect to the source application server. The target application server may also connect to UPF0. In this condition, no PSA relocation (UPF change) is met. On the other hand, the target application server may connect to another UPF, e.g. UPF1. In this condition, PSA relocation is met.

In optional step 403, a condition for an AF notification, e.g. PSA relocation (from UPF0 to UPF1), has been met.

In optional step 404, the SMF sends notification (e.g. UPF change from UPF0 to UPF1) to the AF that is subscribed for SMF notifications.

In optional step 405, the AF acknowledges the notification.

In step 406, the SMF makes decision for server discovery for the application based on the information obtained in step 402.

If the traffic routing preference for the application server change obtained in step 402 indicates that the traffic is preferred to be steered within core network (and that the UE can be unware of the server change), step 407 is performed. Step 407 is the same as step 215 in FIG. 2. Detailed description of step 407 is omitted. Note that FIG. 4 illustrates that, in step 407, the SMF updates the UPF1 with the forwarding rule for steering the traffic to the target application server. This implies that PSA relocation from UPF0 to UPF1 is met in optional step 403, and the ULCL or BP UPF is co-located with UPF1. If PSA relocation is not performed in optional step 403, the SMF would update UPF0 with the forwarding rule for steering the traffic to the target application server (if there is ULCL or BP UPF for the PDU session, the SMF would update ULCL or BP which may be stand-alone or co-located with UPF0).

If the traffic routing preference for the application server change obtained in step 402 indicates that it is preferred to rediscover the IP address of the application server by the UE, steps 408 and 409 are performed. Steps 408 and 409 are the same as steps 315 and 316 in FIG. 3. Detailed description of steps 408 and 409 is omitted.

According to the third embodiment, the SMF obtains the information on application server change for the application as well as the traffic routing preference for the application server change in step 401 and makes decision to configure UPF1 or UPF0 to steer the traffic to and from the target application server for the application, or configure the UE to rediscover the target application server for the application.

Figure 5:
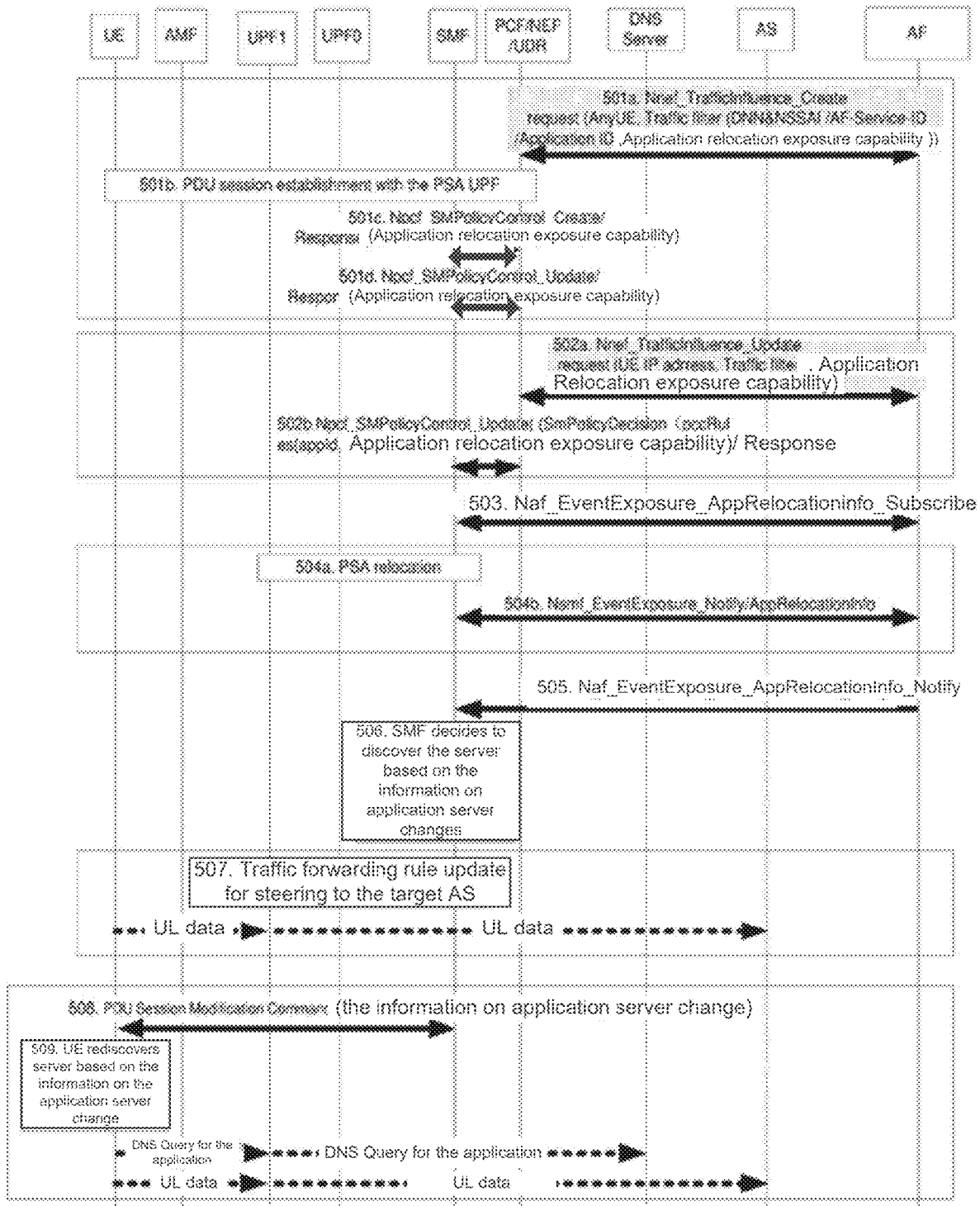
FIG. 5 illustrates an example of server discovery according to a fourth embodiment.

FIG. 5 illustrates a fourth embodiment of the present application. According to the fourth embodiment, it is assumed that (1) service provider deploys the service into the EDNs (Edge Data Networks), and different applications may have different deployments; (2) The AF can obtain the information on application server change for the application when application server changes; and (3) The AF can provide the application relocation exposure capability to the core network.

As shown in FIG. 5, the involved network elements include all of the network elements described in the third embodiment.

The fourth embodiment differs from the third embodiment in how the SMF obtains the information on application server change. According to the fourth embodiment, the AF exposes the application relocation exposure capability to the core network, and the SMF subscribes and obtains the notification from the AF when application server changes.

In step 501a, the AF sends the information for application relocation exposure capability to the core network during the traffic routing procedure for future PDU sessions. As illustrated in FIG. 5, in the Nnef_TrafficInfluence_Create request, "AnyUE" is contained in the parameter, which means that no individual UE is indicated. In FIG. 5, for example, the information for application relocation exposure capability is sent to NEF, and the NEF stores the information in the UDR. A response message may be sent from the NEF to the AF for receiving the information for application relocation exposure capability.

In step 501b, a PDU session is established between the UE and the PSA UPF (e.g. UPF0 illustrated in FIG. 5).

During the PDU session establishment procedure, in step 501c or 501d, the SMF can retrieve the information for application relocation exposure capability from the PCF (or from the UDR via the PCF) using SM Policy Association Establishment or Modification procedure.

In step 502a, the AF can send the information for application relocation exposure capability to the core network (e.g. NEF) for the existing PDU session using traffic routing update message. In step 502b, the SMF can obtain the information for application relocation exposure capability using Npcf_SMPolicyControl_UpdateNotify service operation.

Steps 501a-501d are performed for the SMF receiving the information for application relocation exposure capability for future PDU sessions, while steps 502a-502b are performed for the SMF receiving the information for application relocation exposure capability for an existing PDU session. Therefore, it is possible that only steps 501a-501d are performed or only steps 502a-502b are performed. In other words, it is unnecessary that both steps 501a-501d and steps 502a-502b are performed.

In step 503, the SMF subscribes to the application relocation exposure event from the AF based on the information for application relocation exposure capability obtained in steps 501a-501d or steps 502a-502b.

In step 504a, a condition for an AF notification, e.g. PSA relocation (from UPF0 to UPF1), has been met.

In step 504b, the SMF sends notification to the AF to notify the AF of the PSA relocation (from UPF0 to UPF1). The AF acknowledges the notification.

If a condition for an application server change has been met either based on steps 504a-504b or based on the decision from the application side e.g. load balance among application servers within the EDNs, the AF obtains the information on application server change for the application and traffic routing preference for the application server change. As the application server change may be triggered due to load balance among application servers (which does not lead to PSA relocation), steps 504a-504b may not be performed.

In step 505, the AF notifies the information on application server change for the application and traffic routing preference for the application server change to the core network (i.e. SMF) using Naf_EventExposure_AppRelocationInfo_Notify service operation.

Steps 506-509 are the same as steps 406-409. Detailed description of steps 506-509 is omitted.

According to the fourth embodiment, the SMF obtains the information on application server change for the application as well as the traffic routing preference for the application server change in step 505 and makes decision to configure the ULCL or BP (UPF1 or UPF0 or standalone ULCL or BP) to steer the traffic to and from the target application server for the application, or configure the UE to rediscover the target application server for the application.

In all of the above embodiments, the traffic routing preference for the application server change is obtained by the AF and sent to the SMF. However, the traffic routing preference for the application server change may not be obtained by the AF and sent to the SMF. Moreover, even if the AF obtains the traffic routing preference for the application server change, the AF may not send the obtained traffic routing preference for the application server change to the SMF. In this condition, the SMF may be preconfigured with the traffic routing preference for the application server change.

In another embodiment, the SMF does not receive the traffic routing preference for the application server change from the AF, nor be preconfigured with the traffic routing preference for the application server change. In this condition, when application server changes (e.g. when the SMF obtains information on application server change), the SMF may, based on the information on application server change, make decision to inform UE to rediscover the target application server for the application or configure UPF to steer traffic to and from the target application server for the application. For example, when the information on application server change for the application is indication for application server change (in other words, the SMF does not know the information on the target application server), the SMF can make decision to inform UE to rediscover the target application server for the application, since without the information on the target application server, the UPF cannot steer traffic to and from the target application server for the application.

In all of the above embodiments, the information on application server change is for the application. That is, each application has its different information on application server change, and the traffic routing preference for the application server change is accordingly for the application. In other words, the granularity of both the information on application server change and the traffic routing preference for the application server change is per application. On the other hand, an application has one or more flows. Therefore, the granularity of both the information on application server change and the traffic routing preference for the application server change can be each flow of the application or a part of the flows of the application. In this case, the information exchange between the AF and the core network to influence traffic routing for Sessions can include the related traffic filter to identify the flow(s) of application.

Figure 6:
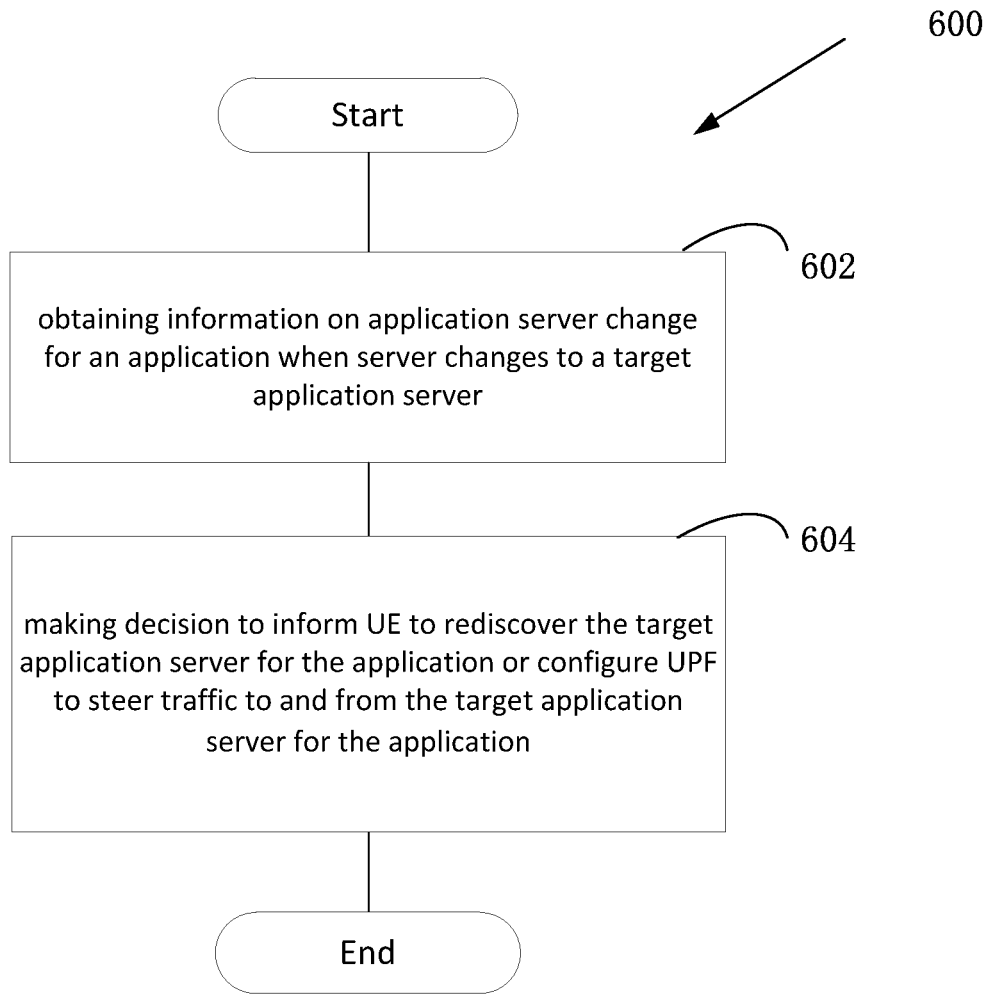
FIG. 6 illustrates is a schematic flow chart diagram illustrating an embodiment of a method.

FIG. 6 is a schematic flow chart diagram illustrating an embodiment of a method 600 according to the present application. In some embodiments, the method 600 is performed by a network function, such as SMF. In certain embodiments, the method 600 may be performed by a processor executing program code, for example, a microcontroller, a microprocessor, a CPU, a GPU, an auxiliary processing unit, a FPGA, or the like.

The method 600 may include 602 obtaining information on application server change for an application when server changes to a target application server; and 604 making decision to inform UE to rediscover the target application server for the application or configure UPF to steer traffic to and from the target application server for the application.

Figure 7:
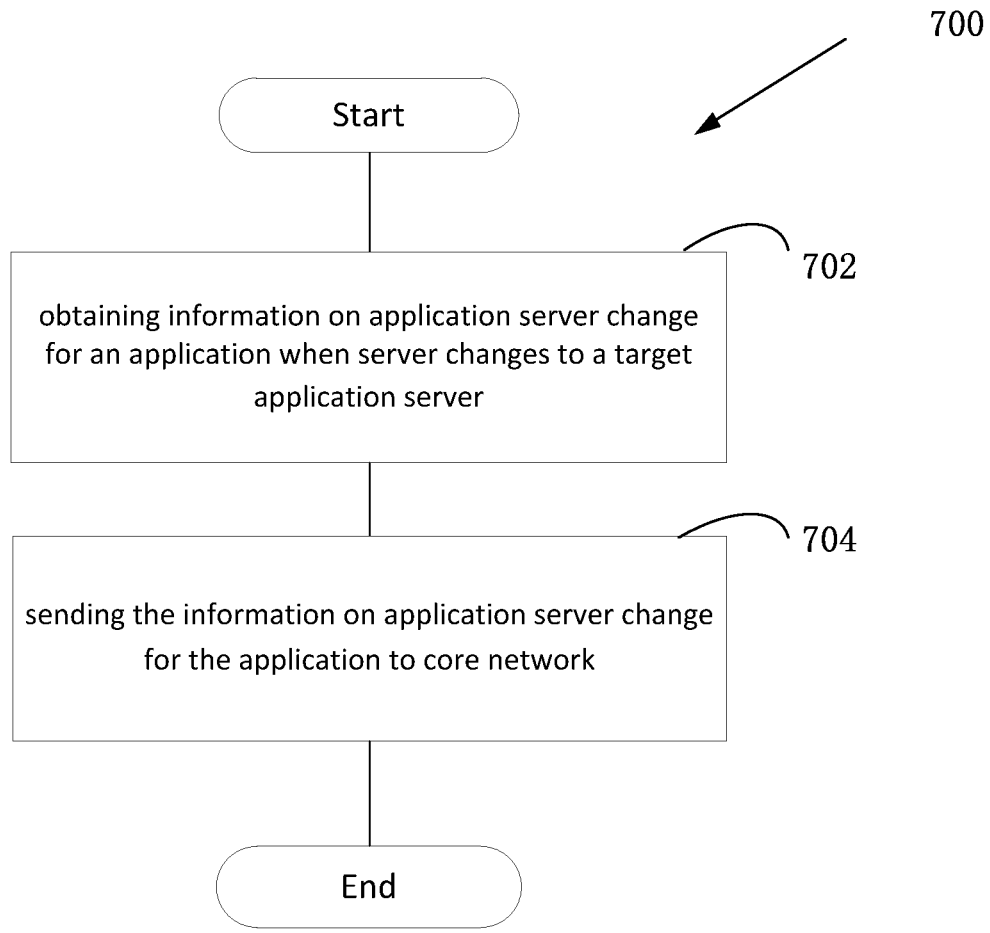
FIG. 7 is a schematic flow chart diagram illustrating a further embodiment of a method.

FIG. 7 is a schematic flow chart diagram illustrating an embodiment of a method 700 according to the present application. In some embodiments, the method 700 is performed by a network function, such as AF. In certain embodiments, the method 700 may be performed by a processor executing program code, for example, a microcontroller, a microprocessor, a CPU, a GPU, an auxiliary processing unit, a FPGA, or the like.

The method 700 may include obtaining information on application server change for an application when server changes to a target application server; and sending the information on application server change to SMF.

Figure 8:
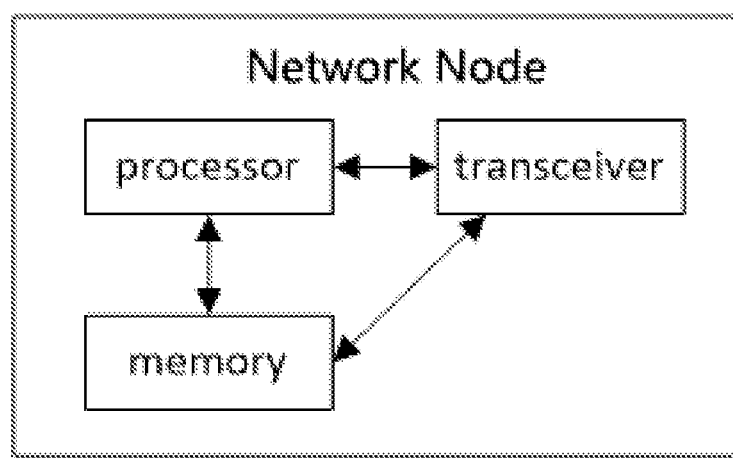
FIG. 8 is a schematic block diagram illustrating an apparatus according to one embodiment.

FIG. 8 is a schematic block diagram illustrating apparatuses according to one embodiment.

Referring to FIG. 8, the network function (e.g. SMF or AF) includes a processor, a memory, and a transceiver. The processor implements a function, a process, and/or a method. The memories are connected with the processors to store various pieces of information for driving the processors. The transceivers are connected with the processors to transmit and/or receive message or information. Needless to say, the transceiver may be implemented as a transmitter to transmit the information and a receiver to receive the information.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a session management function (SMF), the method comprising:
    obtaining information about an application server change for an application in response to server changes of a target application server, the information comprising traffic filtering information for flows of the application; and
    determining, based at least in part on the information, whether to instruct a user equipment (UE) to rediscover the target application server for the application in an edge environment.

2. The method of claim 1, further comprising: obtaining a traffic routing preference for the application server change, and determining based on the obtained traffic routing preference for the application server change.

3. The method of claim 2, wherein the information about the application server change for the application and the traffic routing preference for the application server change are obtained from an application function (AF) and the AF acknowledges a notification of a user plane management event.

4. The method of claim 2, wherein the information about the application server change for the application and the traffic routing preference for the application server change are obtained from information corresponding to an AF update request.

5. An apparatus for performing a network function, the apparatus comprising:
    at least one memory; and
    at least one processor coupled with the at least one memory and configured to cause the apparatus to:
        obtain information about an application server change for an application in response to server changes of a target application server, the information comprising traffic filtering information for flows of the application; and
        determine, based at least in part on the information, whether to instruct a user equipment (UE) to rediscover the target application server for the application in an edge environment.

6. The apparatus of claim 5, wherein at least one processor is configured to cause the apparatus to obtain a traffic routing preference for the application server change, and the processor is configured to determine based on the obtained traffic routing preference for the application server change.

7. The apparatus of claim 6, wherein the information about the application server change for the application and the traffic routing preference for the application server change are obtained from an application function (AF) and the AF acknowledges a notification of a user plane management event.

8. The apparatus of claim 6, wherein the information about the application server change for the application and the traffic routing preference for the application server change are obtained from information corresponding to an AF update request.

9. The apparatus of claim 6, wherein the information about the application server change for the application and the traffic routing preference for the application server change are obtained from an application relocation exposure event notification that is received based on a subscription from an AF.

10. The apparatus of claim 5, wherein the at least one processor is configured to cause the apparatus to instruct the UE to rediscover the target application server for the application.

11. The apparatus of claim 5, wherein the at least one processor is configured to cause the apparatus to transmit configuration information to a user plane function (UPF) to steer traffic to and from the target application server for the application.

12. The apparatus of claim 5, wherein the information about the application server change for the application comprises an indication for the application server change or information about the target application server.

13. The apparatus of claim 6, wherein the information about the application server change for the application and the traffic routing preference for the application server change comprises information about the application server change for flows of the application and the traffic routing preference for the application server change for the flows of the application.

14. An apparatus for performing a network function, the apparatus comprising:
    at least one memory; and
    at least one processor coupled with the at least one memory and configured to cause the apparatus to:
        obtain information about an application server change for an application in response to server changes of a target application server, the information comprising traffic filtering information for flows of the application; and
        send the information about the application server change to a session management function (SMF) for the SMF to determine, based at least in part on the information, whether to instruct a user equipment (UE) to rediscover the target application server for the application in an edge environment.

15. The apparatus of claim 14, wherein the at least one processor is configured to cause the apparatus to obtain a traffic routing preference for the application server change and to cause the apparatus to send the traffic routing preference for the application server change to the SMF.

16. The apparatus of claim 14, wherein the at least one processor is configured to cause the apparatus to send an application relocation exposure capability to the SMF so that the SMF subscribes to an application relocation exposure event notification.

17. The apparatus of claim 15, wherein the information about the application server change for the application and the traffic routing preference for the application server change are sent to the SMF while acknowledging a notification of a user plane management event.

18. The apparatus of claim 15, wherein the information about the application server change for the application and the traffic routing preference for the application server change are sent to a core network via an application function (AF) update request.

19. The apparatus of claim 15, wherein the information about the application server change for the application and the traffic routing preference for the application server change are sent to a core network via an application relocation exposure event notification that is transmitted based on a subscription from an application function (AF) of the apparatus.

20. The apparatus of claim 15, wherein the information about the application server change for the application and the traffic routing preference for the application server change are information about the application server change for the flows of the application and the traffic routing preference for the application server change for the flows of the application.

* * * * *